(12) United States Patent
Fujii

(10) Patent No.: US 7,983,119 B2
(45) Date of Patent: Jul. 19, 2011

(54) OPTICAL DISC APPARATUS

(75) Inventor: Shigeki Fujii, Hanno (JP)

(73) Assignee: TEAC Corporation, Tama-shi, Tokyo (JP)

( * ) Notice: Subject to any disclaimer, the term of this patent is extended or adjusted under 35 U.S.C. 154(b) by 93 days.

(21) Appl. No.: 12/582,630

(22) Filed: Oct. 20, 2009

(65) Prior Publication Data

US 2010/0103784 A1    Apr. 29, 2010

(30) Foreign Application Priority Data

Oct. 23, 2008 (JP) .................................. 2008-273554

(51) Int. Cl.
*G11B 7/00* (2006.01)

(52) U.S. Cl. ................ 369/44.28; 369/44.32; 369/53.19

(58) Field of Classification Search ......................... None
See application file for complete search history.

(56) References Cited

U.S. PATENT DOCUMENTS

| | | | |
|---|---|---|---|
| 7,313,058 B2 * | 12/2007 | Arakawa | 369/44.32 |
| 2005/0180278 A1 * | 8/2005 | Suzuki et al. | 369/44.32 |
| 2005/0207303 A1 * | 9/2005 | Yonezawa | 369/53.19 |
| 2008/0239893 A1 * | 10/2008 | Kataoka | 369/44.29 |

FOREIGN PATENT DOCUMENTS

JP        10-222860 A    8/1998

* cited by examiner

*Primary Examiner* — Christopher R Lamb
(74) *Attorney, Agent, or Firm* — Seed IP Law Group PLLC

(57) ABSTRACT

An optical disc apparatus reliably executes a seek operation even if an optical disc is warped. Tilt adjustment values spanning from the inner circumference to the outer circumference of an optical disc are stored. When seeking from a start address to a destination address, a tilt adjustment value A at the start address and a tilt adjustment address C at the destination address are not directly used. A tilt adjustment value k·C (k<1) is used during a coarse seek operation until the neighborhood of the destination address and a tilt adjustment value C is used during a fine seek operation from the neighborhood of the destination address to the destination address.

8 Claims, 2 Drawing Sheets

OPTICAL DISC APPARATUS

PRIORITY INFORMATION

This application claims priority to Japanese Patent Application No. 2008-273554, filed on Oct. 23, 2008, which is incorporated herein by reference in its entirety.

BACKGROUND

1. Technical Field

The present invention relates to an optical disc apparatus and more particularly to tilt control.

2. Related Art

Heretofore, tilt control is well known for dealing with warped discs in an optical disc apparatus.

JP 10-222860 A discloses a method for reading information from an optical disc by detecting the tilt of the optical disc using a tilt sensor provided at an inner circumference and a tilt sensor provided at an outer circumference, and from the result of detection of the tilt at the inner and outer circumference positions (addresses), calculating and predicting the direction and amount of tilt at various parts of the optical disc, and on the basis of the predicted calculation result, driving a tilt servo motor in accordance with the tilt at the address position and applying correction.

Although predicting and storing in advance into memory tilt angles at various positions on an optical disc, and then adjusting to the tilt angle stored in memory is effective when reading out data, a problem arises if the tilt angles differ greatly at various positions on the optical disc, in particular, if the tilt angles differ greatly between the inner circumference and the outer circumference. Namely, when the optical pickup is moved from an inner circumference position to an outer circumference position during a seek operation to read data, performing the seek operation with the optimum tilt angle at the inner circumference position prevents the address from being read at the outer circumference position and the seek operation is not possible since the tilt angle at the inner circumference position differs greatly from the tilt angle at the outer circumference position. As a result, it becomes necessary to adjust to the tilt angle at the destination outer circumference position during or immediately prior to the seek operation. However, controlling the tilt angle during the seek operation is difficult and causes accuracy problems. Furthermore, when adjusted to the tilt angle at the outer circumference position immediately prior to the seek operation, a problem occurs where the address cannot be read at the inner circumference position, which is the start position of the seek operation.

SUMMARY

The present invention provides an optical disc apparatus capable of reliably seeking until a desired address position so that data can be read even if an optical disc has a considerable warp.

The present invention includes a storing unit for storing a tilt adjustment value spanning from an inner circumference to an outer circumference of an optical disc, and a seeking unit for performing seek, when an optical pickup seeks from a start address to a destination address of the optical disc, from the start address to neighborhood of the destination address with an adjustment value between the tilt adjustment value at the start address and the tilt adjustment value at the destination address, and thereafter from neighborhood of the destination address to the destination address with the tilt adjustment value at the destination address.

According to an embodiment of the present invention, when the tilt adjustment value at the start address is denoted as A and the tilt adjustment value at the destination address is denoted as C, the adjustment value between the tilt adjustment value at the start address and the tilt adjustment value at the destination address is given as $k \cdot C$ (where $0 < k < 1$).

Furthermore, according to another embodiment of the present invention, when the tilt adjustment value at the start address is denoted as A and the tilt adjustment value at the destination address is denoted as C, the adjustment value between the tilt adjustment value at the start address and the tilt adjustment value at the destination address is given as $(A+C)/2$.

Moreover, according to another embodiment of the present invention, with the tilt adjustment value at the start address denoted as A and the tilt adjustment value at the destination address denoted as C, when a difference value (C−A) is greater than or equal to a threshold, a seek operation is performed from the start address to neighborhood of the destination address with the adjustment value between the tilt adjustment value at the start address and the tilt adjustment value at the destination address, and when the difference value (C−A) is less than the threshold, a seek operation is performed from the start address to neighborhood of the destination address with the tilt adjustment value A at the start address or the tilt adjustment value C at the destination address.

According to the present invention, seeking until a desired address position can be reliably performed so that data can be read even if an optical disc has a considerable warp.

DETAILED DESCRIPTION

An embodiment will hereinafter be described with reference to the attached drawings.

Figure 1:
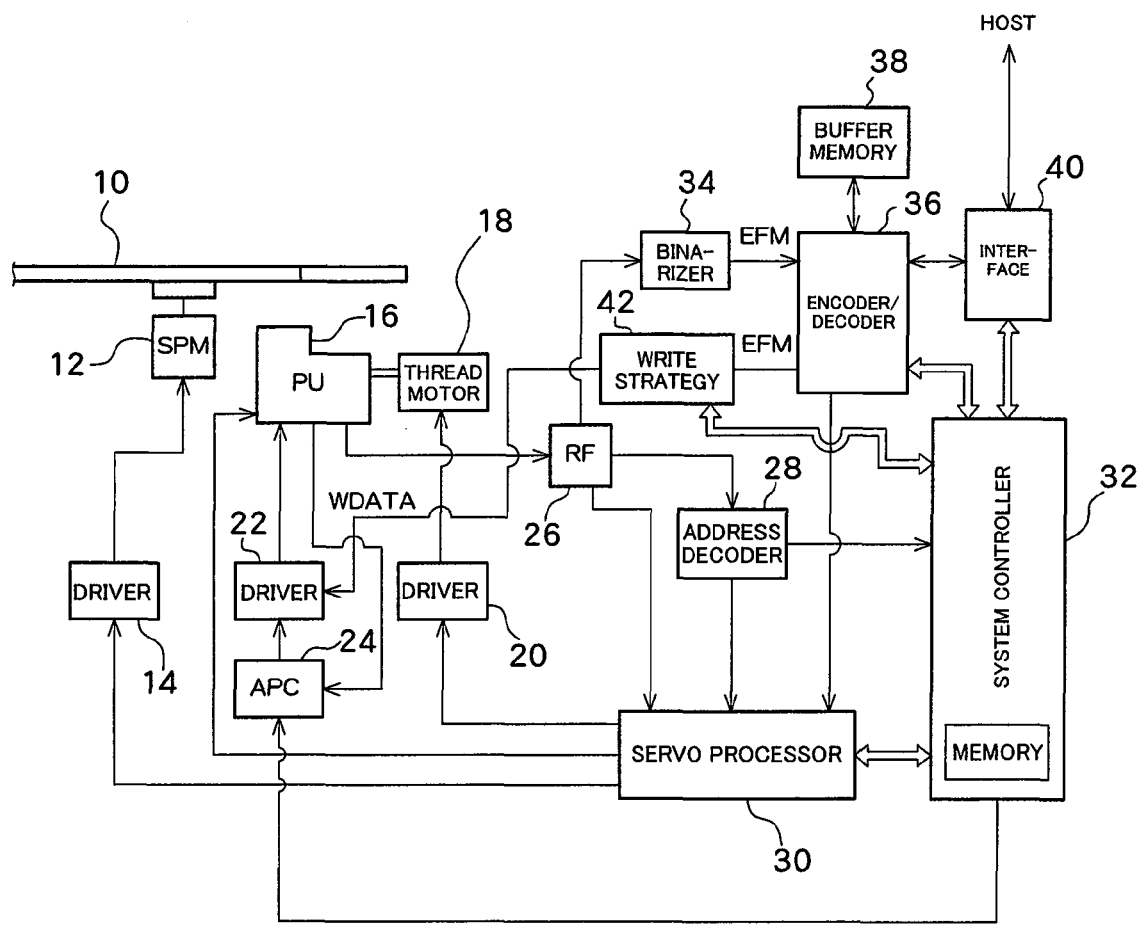
FIG. 1 is a block diagram of an optical disc apparatus in an embodiment.

FIG. 1 shows a general configuration of an optical disc apparatus of the embodiment. An optical disc 10 is driven by a spindle motor (SPM) 12. The SPM 12 is driven by a driver 14 and the driver 14 is servo controlled by a servo processor 30 so that a desired rotational speed is achieved.

An optical pickup 16 includes a laser diode (LD) for emitting laser light onto the laser disc 10 and a photo detector (PD) for receiving reflected light from the laser disc 10 and converting into an electric signal and is arranged facing the optical disc 10. The optical pickup 16 is driven along a radial direction of the optical disc 10 by a thread motor 18 formed from a stepping motor and the thread motor 18 is driven by a driver 20. Similar to driver 14, the driver 20 is servo controlled by the servo processor 30. Furthermore, the LD of the optical pickup 16 is driven by a driver 22 and the driver 22 is controlled by an auto power control circuit (APC) 24 so that a driving current reaches a desired value. The APC 24 and the driver 22 control the amount of emitted light of the LD by command from a system controller 32. Although the driver 22 shown in the figure is provided separately from the optical pickup 16, the driver 22 may be mounted in the optical pickup 16.

When playing back data recorded on the optical disc 10, laser light at playback power is emitted from the LD of the optical pickup 16 and the reflected light is converted into an electric signal at the PD and output. The playback signal from the optical pickup 16 is supplied to an RF circuit 26. The RF circuit 26 generates a tracking error signal and a focus error signal from the playback signal and supplies them to the servo processor 30. On the basis of these error signals, the servo processor 30 performs servo control of the optical pickup 16 and maintains the optical pickup 16 in an on-focus state and on-track state. Furthermore, the RF circuit 26 supplies an address signal included in the playback signal to an address decoder circuit 28. The address decoder circuit 28 demodulates address data of the optical disc 10 from the address signal and supplies demodulated address data to the servo processor 30 and the system controller 32. Furthermore, the RF circuit 26 supplies a playback RF signal to a binarizer circuit 34. The binarizer circuit 34 binarizes the playback signal and supplies the obtained signal to an encoder/decoder circuit 36. The encoder/decoder circuit 36 demodulates and error corrects the binarized signal to yield playback data, which is output to a host apparatus, such as a personal computer, via an interface 40. When playback data is output to the host apparatus, the playback data is initially stored into a buffer memory 38 then output by the encoder/decoder circuit 36.

When recording data to the optical disc 10, the data to be recorded from the host apparatus is supplied to the encoder/decoder circuit 36 via the interface 40. The encoder/decoder circuit 36 stores the data to be recorded into the buffer memory 38, and encodes the data to be recorded into modulation data, which is supplied to a write strategy circuit 42. The write strategy circuit 42 converts the modulation data into multiple pulses (pulse train) according to a predetermined recording strategy and supplies the pulse train as recording data to the driver 22. Laser light, which is power modulated by the recording data, is emitted from the LD of the optical pickup 16 to record data onto the optical disc 10. After the data is recorded, the optical pickup 16 emits laser light at playback power and the recording data is played back and supplied to the RF circuit 26. The RF circuit 26 supplies the playback signal to the binarizer circuit 34 and the binarized data is supplied to the encoder/decoder circuit 36. The encoder/decoder circuit 36 decodes the modulation data for verification with the recording data stored in the buffer memory 38. The result of verification is supplied to the system controller 32. According to the verification result, the system controller 32 decides to continue recording data or to execute an alternate process. The system controller 32 controls the operation of the overall system, drives the thread motor 18 via the servo processor 30, and controls the position of the optical pickup 16.

Due to assembly tolerance variations of the optical disc apparatus, for example, the incident angle of laser light from the optical pickup 16 with respect to the optical disc may deviate (tilt deviation) from a predetermined angle set by design even if an ideal optical disc without warp has been mounted. In this configuration, a reference disc having low eccentricity, surface deflection, and tilt component is prepared in advance, a tilt adjustment value Ad is measured at the inner circumference where the effect of warp is small, and the measurement result is stored into memory of the system controller 32. Then, with the optical disc (startup disc) 10 for recording and playback mounted, the system controller 32 reads the adjustment value Ad stored in memory and corrects the tilt angle of the optical pickup 16. Namely, the tilt adjustment value is applied to the optical pickup 16 and tilt adjustment is performed prior to focus control and tracking control. Thus, tilt deviation present in the optical disc apparatus can be corrected in advance when an optical disc for recording and playback is mounted, namely, prior to startup of the optical disc.

Furthermore, two types of components of disc warp are inner circumference warp and outer circumference warp. It is often the case where the warp angle, which is consistent in the neighborhood of the inner circumference, suddenly increases from an intermediate circumference to the outer circumference. Therefore, even if recording and playback are possible by performing an adjustment using the adjustment value Ad stored in advance in the memory at the neighborhood of the inner circumference (where the influence of warp is small since the rotational speed at the inner circumference is relatively low), the adjustment becomes insufficient with the adjustment value Ad spanning from the inner circumference to the outer circumference and there is a risk recording and playback are not possible.

Accordingly, taking into consideration the necessity of the optical pickup 16 seeking toward the outer circumference at the startup of the optical disc apparatus, such as for detection of track pitch and detection of outer circumference error rate, when the seek operation of the optical pickup 16 is performed toward the outer circumference during detection of track pitch and detection of outer circumference error rate, at the same time the tilt adjustment value is measured at the outer circumference and stored into the memory of the system controller 32. Naturally, the tilt adjustment value may also be measured at an intermediate circumference and further at the inner circumference. For example, the optical disc is divided into multiple zones from the inner circumference to the outer circumference and the tilt adjustment value is measured at each zone and stored into memory. An example is shown next where the optical disc is divided into four zones of zone I, zone II, zone III, and zone IV from the inner circumference to the outer circumference and the tilt adjustment value at each zone is measured.

Zone I: Tilt adjustment value A
Zone II: Tilt adjustment value A
Zone III: Tilt adjustment value B
Zone IV: Tilt adjustment value C
(where A<B<C)

Then, when a seek operation of the optical pickup 16 is performed from a zone to another zone, the adjustment values stored in memory are not used directly and a coefficient k (where 0<k<1 and a value satisfying A<k·C<C) is used to further adjust the tilt adjustment values.

Namely, when playing back data in zone I, the tilt adjustment value for zone I is A so that the tilt adjustment value is changed from Ad to A. Then, to seek from zone I to zone IV, when executing a seek operation by changing the tilt adjustment value from A in zone I immediately prior to the seek operation to C in zone IV, reading of an address in zone I will not be possible due to the difference between adjustment value A and adjustment value C.

Accordingly, in the embodiment, when seeking from zone I to zone IV, the adjustment value C in zone IV immediately prior to the seek operation is not used directly and the tilt adjustment is performed using k·C as the tilt adjustment value. Since A<C and k<1, k·C is an adjustment value closer to A compared to C. This means that changing from A to k·C exerts less of an influence on reading an address in zone I compared to changing the tilt adjustment value from A to C immediately prior to the seek operation in zone I and as a result also means that the possibility is high for reading addresses in both zone I and zone IV.

On the other hand, in general, when seeking from a start address to a destination address, a general or coarse seek operation is first performed from the start address to the neighborhood of the destination address, and thereafter a narrow or fine seek operation is performed from the neighborhood of the destination address to the destination address. Taking this into consideration, in the embodiment the tilt adjustment value k·C is used in the general or coarse seek operation to the neighborhood of the destination address positioned within zone IV and the optimum adjustment value C in zone IV is used in the narrow or fine seek operation to the destination address.

Figure 2:
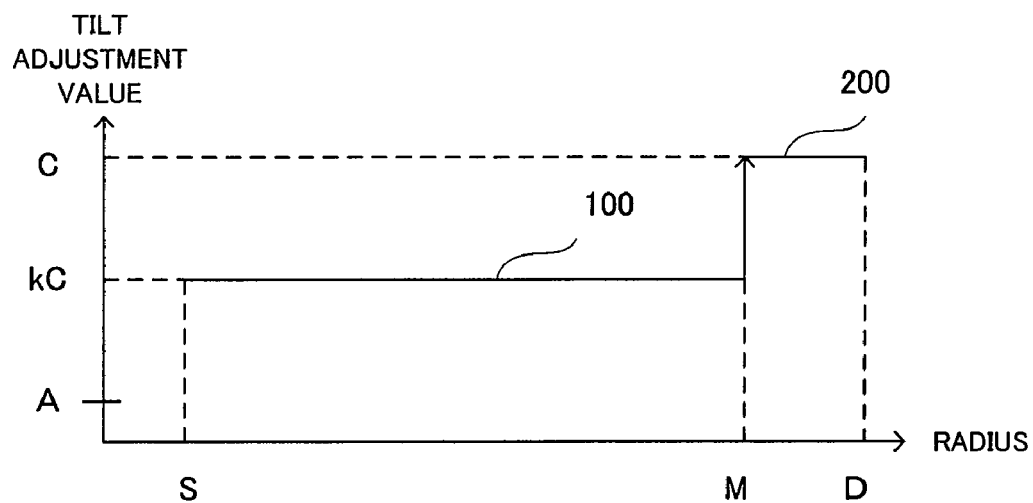
FIG. 2 illustrates a change of tilt adjustment values during seek operation.

FIG. 2 shows the tilt adjustment values during seek in the embodiment from a start address S within zone I to a destination address D within zone IV. The seek operation includes two steps in the form of a coarse seek 100, which is performed from the start address to the neighborhood of the destination address D, and a fine seek 200, which is performed from a neighborhood address M to the destination address D.

Coarse seek 100 is executed by changing the tilt adjustment value from A to k·C at the start address S. Since the tilt adjustment value k·C is a value between tilt adjustment value A in zone I and the tilt adjustment value C in zone IV, addresses can be read in either zone I or zone IV. When executing the fine seek 200, the tilt adjustment value in the neighborhood address M is changed from k·C to C since the seek operation is within the same zone IV. This enables the seek operation to be performed until the final destination address D.

The seek operation from zone I to zone IV was described hereinabove. The opposite seek operation from zone IV to zone I is similar. Namely, the coarse seek operation from the start address of zone IV to the destination address neighborhood of zone I is performed using a tilt adjustment value m·A (where coefficient m satisfies A<m·A<C) and the fine seek operation from the destination address neighborhood to the destination address is performed using the optimum adjustment value A.

Furthermore, when seeking from zone I to zone III, a course seek operation is performed from the start address of zone I to the destination address neighborhood of zone III using a tilt adjustment value u·B (where coefficient u is a value satisfying A<u·B<B) and a fine seek operation from the destination address neighborhood to the destination address is performed using the optimum adjustment value B in zone III.

In the embodiment, when the tilt adjustment values of the zone in the seek start address and the zone in the destination address are different, the tilt adjustment value is further adjusted, then the seek operation is performed. However, a difference value between tilt adjustment values of the zone in the seek start address and the zone in the destination address may be compared with a threshold value and the coarse seek operation may be performed using the tilt adjustment value corrected by multiplying with a coefficient when the different value is greater than or equal to the threshold or using the tilt adjustment value directly when the difference value is less than the threshold. For example, when seeking from zone I to zone IV with the threshold Vth, if the difference value (C−A) is greater than or equal to the threshold Vth, the coarse seek operation is executed using k·C, and if the difference value (C−A) is less than the threshold Vth, the coarse seek operation is executed directly using the tilt adjustment value C or A. Furthermore, if the difference value (C−A) is greater than or equal to the threshold Vth and the difference value (B−A) is less than the threshold, the coarse seek operation is performed by correcting the tilt adjustment value when seeking from zone I to zone IV and the coarse seek operation is performed using the tilt adjustment value B or A directly when seeking from zone I to zone III.

When seeking from zone I to zone IV in the embodiment, the coarse seek operation is executed using the tilt adjustment value k·C. However, the coarse seek operation may be executed using a median value of A and C, namely, (A+C)/2, instead of k·C. In other words, in FIG. 2, the tilt adjustment value (A+C)/2 is used in the coarse seek operation from start address S to the destination address neighborhood M and the tilt adjustment value C is used in the fine seek operation from the destination address neighborhood M to the destination address D. Using the median value of A and C as the tilt adjustment value enables addresses to be read in either zone I and zone IV. Furthermore, the coarse seek operation may be executed using v·(A+C)/2. Here, the coefficient v is a value in the neighborhood of 1.

Figure 3:
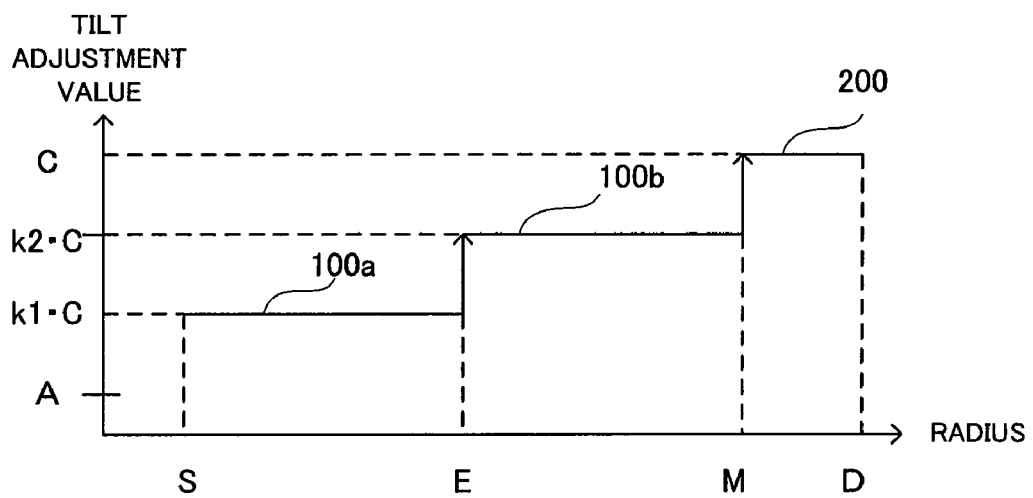
FIG. 3 illustrates a change during another tilt adjustment during seek operation.

Furthermore, although a two-step seek operation of the coarse seek 100 and the fine seek 200 are performed in the embodiment, if the difference value (C−A) is considerably large compared to the threshold Vth, the coarse seek 100 can further be divided into two. FIG. 3 shows the changing of the tilt adjustment value in this case. When seeking from the start address S of zone I to the destination address D of zone IV, the coarse seek 100 from the start address S to the destination address neighborhood M is divided into a first coarse seek 100a and a second coarse seek 100b. The first coarse seek 100a is a seek operation from the start address S to an intermediate address E and the second coarse seek 100b is a seek operation from the intermediate address E to the destination address neighborhood M. The first coarse seek 100a uses a tilt adjustment value k1·C and the second coarse seek 100b uses a tilt adjustment value k2·C. Here, A<k1·C<k2·C<C.

Furthermore, although the optical disc is divided into multiple zones in the embodiment, the number of zones can be arbitrarily set to the three zones of inner circumference, intermediate circumference, and outer circumference or divided into five zones or more.

Moreover, although the optical disc is divided into multiple zones in the embodiment, dividing the optical disc into zones is not absolutely necessary. The tilt adjustment value may be measured and stored into memory at multiple radius positions on the optical disc and at positions other than the measured radius positions the tilt adjustment value at an arbitrary position may be calculated by approximation using linear interpolation or curve interpolation. At radius positions of the inner circumference to the intermediate circumference having relatively small warp the adjustment value at the inner circumference of a reference disc or the adjustment value at the inner circumference of a disc for recording/playback may be stored into memory and used. In this case also, when seeking from the start address to the destination address, a coarse seek operation may be performed by multiplying the tilt adjustment value at the destination address with the coefficient k, and thereafter a fine seek operation may be performed with the tilt adjustment value at the destination address.

Furthermore, in the case when seeking from zone I to zone IV in the embodiment, for example, the tilt adjustment value k·C is used in the coarse seek operation from the start address S to the destination address neighborhood M and the tilt adjustment value is changed to C in the fine seek operation until the destination address D if the address can be read at the destination address neighborhood M. However, if the address cannot be read at the destination address neighborhood M when the coarse seek operation is performed using the tilt adjustment value k·C, the coarse seek operation may be retried by adjusting the coefficient k to coefficient k' (where k'<k) or adjusting the coefficient k to (A+B)/2.

Furthermore, a judgment may be made in the embodiment to determine whether the optical disc 10 is an 8 cm disc or a 12 cm disc. If the optical disc 10 is an 8 cm disc, disc warp may be considered to be practically non-existent and the seek operation may be executed by applying the adjustment value Ad of the inner circumference of a reference disc directly to the entire 8 cm disc. If the optical disc 10 is a 12 cm disc, the seek operation may be executed by further adjusting the tilt adjustment value as described hereinabove.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An optical disc apparatus comprising:
    a storing unit for storing a tilt adjustment value spanning from an inner circumference to an outer circumference of an optical disc; and
    a seeking unit for performing seek, when an optical pickup seeks from a start address to a destination address of said optical disc, from said start address to neighborhood of said destination address with an adjustment value between said tilt adjustment value at said start address and said tilt adjustment value at said destination address, and thereafter from neighborhood of said destination address to said destination address with said tilt adjustment value at said destination address.

2. An apparatus according to claim 1 wherein:
    when said tilt adjustment value at said start address is denoted as A and said tilt adjustment value at said destination address is denoted as C, the adjustment value between said tilt adjustment value at said start address and said tilt adjustment value at said destination address is given as k·C (where 0<k<1).

3. An apparatus according to claim 1 wherein:
    when said tilt adjustment value at said start address is denoted as A and said tilt adjustment value at said destination address is denoted as C, the adjustment value between said tilt adjustment value at said start address and said tilt adjustment value at said destination address is given as (A+C)/2.

4. An apparatus according to claim 1 wherein:
    with said tilt adjustment value at said start address denoted as A and said tilt adjustment value at said destination address denoted as C, when a difference value (C−A) is greater than or equal to a threshold, a seek operation is performed from said start address to neighborhood of said destination address with the adjustment value between said tilt adjustment value at said start address and said tilt adjustment value at said destination address, and when the difference value (C−A) is less than the threshold, a seek operation is performed from said start address to neighborhood of said destination address with said tilt adjustment value A at said start address or said tilt adjustment value C at said destination address.

5. An apparatus according to claim 1 wherein:
    said storing unit stores tilt adjustment values of respective zones when said optical disc is divided into a plurality of zones from inner circumference to outer circumference.

6. An apparatus according to claim 1 wherein:
    said storing unit stores said tilt adjustment values of a plurality of radius positions of said optical disc.

7. An apparatus according to claim 6, wherein:
    said storing unit stores a tilt adjustment value at an inner circumference of a reference optical disc for radius positions from the inner circumference to an intermediate radius of said optical disc.

8. An apparatus according to claim 1 wherein:
    said tilt adjustment value is measured when said optical pickup seeks toward the outer circumference for track pitch detection or outer circumference error rate detection during startup of said apparatus.

* * * * *